(12) United States Patent
Miao et al.

(10) Patent No.: US 12,365,603 B2
(45) Date of Patent: Jul. 22, 2025

(54) REPAIRING MATERIAL FOR EMERGENCY TREATMENT OF BLACK AND ODOROUS SURFACE WATER ENVIRONMENT AND ITS PREPARATION METHOD

(71) Applicant: Jiangnan University, Wuxi (CN)

(72) Inventors: Hengfeng Miao, Wuxi (CN); Ziwen Chen, Wuxi (CN); Yingying Jiang, Wuxi (CN); Yuping Li, Wuxi (CN); Wenquan Ruan, Wuxi (CN)

(73) Assignee: Jiangnan University, Wuxi (CN)

( * ) Notice: Subject to any disclaimer, the term of this patent is extended or adjusted under 35 U.S.C. 154(b) by 533 days.

(21) Appl. No.: 17/843,399

(22) Filed: Jun. 17, 2022

(65) Prior Publication Data
US 2022/0324726 A1   Oct. 13, 2022

Related U.S. Application Data

(63) Continuation of application No. PCT/CN2020/136104, filed on Dec. 14, 2020.

(30) Foreign Application Priority Data

Dec. 30, 2019   (CN) .......................... 201911401275.5

(51) Int. Cl.
| | | |
|---|---|---|
| *C02F 1/28* | (2023.01) | |
| *B01J 20/04* | (2006.01) | |
| *B01J 20/20* | (2006.01) | |
| *B01J 20/30* | (2006.01) | |
| *C02F 1/72* | (2023.01) | |
| *C02F 101/16* | (2006.01) | |
| *C02F 103/00* | (2006.01) | |

(52) U.S. Cl.
CPC ............. *C02F 1/283* (2013.01); *B01J 20/041* (2013.01); *B01J 20/20* (2013.01); *B01J 20/3021* (2013.01); *B01J 20/3071* (2013.01); *B01J 20/3085* (2013.01); *C02F 1/722* (2013.01); *C02F 2101/16* (2013.01); *C02F 2101/40* (2013.01); *C02F 2103/007* (2013.01); *C02F 2303/02* (2013.01)

(58) Field of Classification Search
CPC .......... C02F 1/283; C02F 1/722; C02F 1/529; B01J 20/041; B01J 20/20; B01J 20/3021; B01J 20/3071; B01J 20/3085
See application file for complete search history.

(56) References Cited

U.S. PATENT DOCUMENTS

| | | | | | |
|---|---|---|---|---|---|
| 3,803,033 | A | * | 4/1974 | Sutherland ......... | B01D 21/0012 |
| | | | | | 210/695 |
| 4,225,463 | A | * | 9/1980 | Unger ...................... | B01J 20/20 |
| | | | | | 502/426 |
| 5,705,269 | A | * | 1/1998 | Pimenov .................. | C02F 1/283 |
| | | | | | 428/401 |
| 6,132,620 | A | * | 10/2000 | Robinson ............... | B01D 17/04 |
| | | | | | 210/744 |
| 2012/0219799 | A1 | * | 8/2012 | Omori ...................... | B01J 20/06 |
| | | | | | 239/11 |
| 2018/0245180 | A1 | * | 8/2018 | Cheng ................ | B01J 20/28004 |

FOREIGN PATENT DOCUMENTS

| | | | | |
|---|---|---|---|---|
| CN | 106006789 | A | | 10/2016 |
| CN | 107051377 | A * | 8/2017 | ............ B01J 20/041 |
| CN | 108516596 | A | | 9/2018 |
| CN | 110449120 | A | | 11/2019 |
| CN | 110980922 | A | | 4/2020 |
| IN | 108821529 | A | | 11/2018 |
| JP | 2005177552 | A | | 7/2005 |

OTHER PUBLICATIONS

ISR of PCT/CN2020/136104 (Year: 2021).*
WOISA of PCT/CN2020/136104 (Year: 2021).*

* cited by examiner

*Primary Examiner* — Liam Royce
(74) *Attorney, Agent, or Firm* — IPRO, PLLC; Na Xu

(57) ABSTRACT

The disclosure provides a repairing material for emergency treatment of a black and odorous surface water environment and its preparation method, belonging to the fields of environmental science and engineering technology. The preparation method of the disclosure specifically includes the following steps: (1) uniformly stirring activated carbon, calcium chloride, ammonia water solution, polyethylene glycol and water in a stirrer, then dropwise adding hydrogen peroxide, and after the completion of the dropwise adding, obtaining a calcium peroxide repairing material solution; (2) adding a sodium hydroxide solution to the calcium peroxide repairing material solution obtained in step (1) until a pH reaches 11.5, thereby obtaining a suspension; (3) centrifuging the suspension in step (2) to obtain a solid; and (4) washing the solid in step (3) with distilled water until a final pH of residual water reaches 8.4, and then drying the obtained precipitate to obtain the repairing material. The repairing material of the disclosure has good treatment effect and high efficiency.

11 Claims, 7 Drawing Sheets

REPAIRING MATERIAL FOR EMERGENCY TREATMENT OF BLACK AND ODOROUS SURFACE WATER ENVIRONMENT AND ITS PREPARATION METHOD

TECHNICAL FIELD

The disclosure relates to a repairing material for emergency treatment of a black and odorous surface water environment and its preparation method, belonging to the fields of environmental science and engineering technology.

BACKGROUND

With the development of economy, the problem of water pollution is getting worse and worse. Water bodies are eutrophicated, and even black and odorous rivers have appeared. By February 2017, a total of 1861 water bodies (85.7% of rivers and 14.3% of lakes) in China were marked as black and odorous water bodies. For this reason, on Sep. 30, 2018, the Ministry of Housing and Urban-Rural Development and the Ministry of Ecology and Environment jointly issued the *Implementation Plan for Treatment Battle of Urban Black and Odorous Water Bodies*, which clearly requires that by the end of 2020, more than 90% of black and odorous water bodies should be eliminated in built-up areas of prefecture-level and above cities in all provinces and autonomous regions. Therefore, how to treat black and odorous water bodies is an urgent problem to be solved.

When a water body becomes black and odorous, it will lose its self-purification ability. The water body will become unsuitable for the submerged plants to grow due to its low transparency and the large amount of pollutants in the water body. A combination of artificial aeration and bioremediation to treat the black and odorous water body requires a long time span and takes effect slowly.

At present, in order to increase the transparency of a water body, flocculants such as iron or aluminum salts are usually added to quickly relieve the black and odorous phenomenon. However, the iron or aluminum salts are toxic to aquatic organisms, and will affect subsequent restoration of the water ecosystem. Activated carbon, due to its characteristics including high porosity and large specific surface area, can adsorb most pollutants and have good effects on decolorization and deodorization. However, the activated carbon cannot increase the dissolved oxygen in the water body, and may be easily affected by the flow of water due to its light weight.

SUMMARY

At present, when calcium peroxide is used in a surface water environment, the calcium peroxide is just used alone or simply mixed with other materials in proportion, and thus cannot fully exert its effect on the water environment. In order to solve at least one of the above problems, in the disclosure, nano calcium peroxide is supported on the surface of activated carbon at the molecular level, which leads to an increase in the utilization efficiency of the calcium peroxide and a decrease in the amount of calcium peroxide added and can reduce the risk of an increase in pH caused by addition of excessive calcium peroxide.

A first object of the disclosure provides a preparation method of a repairing material for emergency treatment of a black and odorous surface water environment, specifically including the following steps:

(1) uniformly stirring activated carbon, calcium chloride, ammonia water solution, polyethylene glycol and water in a stirrer, then dropwise adding hydrogen peroxide solution with stirring, and after the completion of the dropwise adding, obtaining a calcium peroxide repairing material solution;

(2) adding a sodium hydroxide solution to the calcium peroxide repairing material solution obtained in step (1) until a pH reaches 11.5, thereby obtaining a suspension;

(3) centrifuging the suspension in step (2) to obtain a precipitate; and (4) washing the precipitate in step (3) with distilled water until a final pH of residual water reaches 8.4, and then drying the obtained precipitate to obtain the repairing material.

In one embodiment, in step (1), the activated carbon is pretreated by the following steps: soaking activated carbon in 0.5-1.5 mol·L$^{-1}$ hydrochloric acid solution for 1.5-2.5 h, repeatedly washing the activated carbon with deionized water until the residual water is neutral, soaking the activated carbon in 0.5-1.5 mol·L$^{-1}$ sodium hydroxide solution for 1.5-2.5 h, repeatedly washing the activated carbon with deionized water until the residual water is neutral to such that impurities are removed, drying the activated carbon in an oven at 105° C., grinding the activated carbon, and passing the powdered activated carbon through a 200-mesh sieve.

In one embodiment, in step (1), the activated carbon is purchased from Sinopharm Chemical Reagent Co., Ltd.

In one embodiment, in step (1), a mass ratio of the activated carbon to the calcium chloride to the water is 1-3:13:30.

In one embodiment, in step (1), a mass/volume ratio of the activated carbon to the ammonia water solution to the polyethylene glycol is (1-3) g:15 mL:120 mL.

In one embodiment, in step (1), the hydrogen peroxide solution has a concentration of 30%, and is dropwise added at a rate of 3 drops per minute.

In one embodiment, in step (1), the ammonia water solution has a concentration of 1 mol·L$^{-1}$.

In one embodiment, in step (1), the uniform stirring is carried out at a speed of 180 rpm for 30 min in aspects of specific parameters.

In one embodiment, in step (1), a mass/volume ratio of the activated carbon to the hydrogen peroxide solution is 1-3 g:15 mL.

In one embodiment, in step (1), the whole reaction process is completed at room temperature (25° C.).

In one embodiment, in step (2), the sodium hydroxide solution has a pH of 13.

In one embodiment, in step (3), the centrifuging is carried out at a speed of 4000 rpm for 10 min in aspects of parameters.

In one embodiment, in step (3), the solid obtained after the centrifuging is first washed with a NaOH solution 3 times.

In one embodiment, in step (4), the precipitate is washed with distilled water 2 times.

In one embodiment, in step (4), the drying is drying in a vacuum oven at 80° C. for 2-4 h.

A second object of the disclosure provides a repairing material obtained by the preparation method of the disclosure.

A third object of the disclosure provides use of the repairing material of the disclosure in emergency treatment of a black and odorous surface water environment.

In one embodiment, the repairing material of the disclosure is added to black and odorous surface water in an amount of 150 mg/L.

The disclosure has the following beneficial effects:

(1) The activated carbon-supported calcium peroxide prepared in the disclosure has both the adsorbing ability of activated carbon and the ability of calcium peroxide to release oxygen and hydrogen peroxide, which can increase the utilization of calcium peroxide and is beneficial to ecological remediation of the black and odorous water body.

(2) When being used for treatment of a seriously polluted black and odorous water body, the activated carbon-supported calcium peroxide prepared in the disclosure can greatly enhance the removal effect of pollutants, especially nitrogen, phosphorus and heavy metals, and can also increase the dissolved oxygen and transparency of the water body and remove odorous substances without harming the environment.

(3) When the repairing material of the disclosure is used in treatment of a water body inferior to Class V, after 1 day, the removal rate of ammonia nitrogen is 59%, the removal rate of COD is 65%, the removal rate of TP is 89%, and the water body reaches the standard of Class V water. When the repairing material is used in treatment of a black and odorous water body, after 3 days, the removal rate of ammonia nitrogen is 58%, the removal rate of COD is 63%, the removal rate of TP is 87%, the removal rate of dimethyl sulfide is up to 100%, the odor of the water body is significantly reduced, and the DO in the water body is up to 3.12 mg/L, so that the black and odorous phenomenon is eliminated.

DETAILED DESCRIPTION

Figure 1:
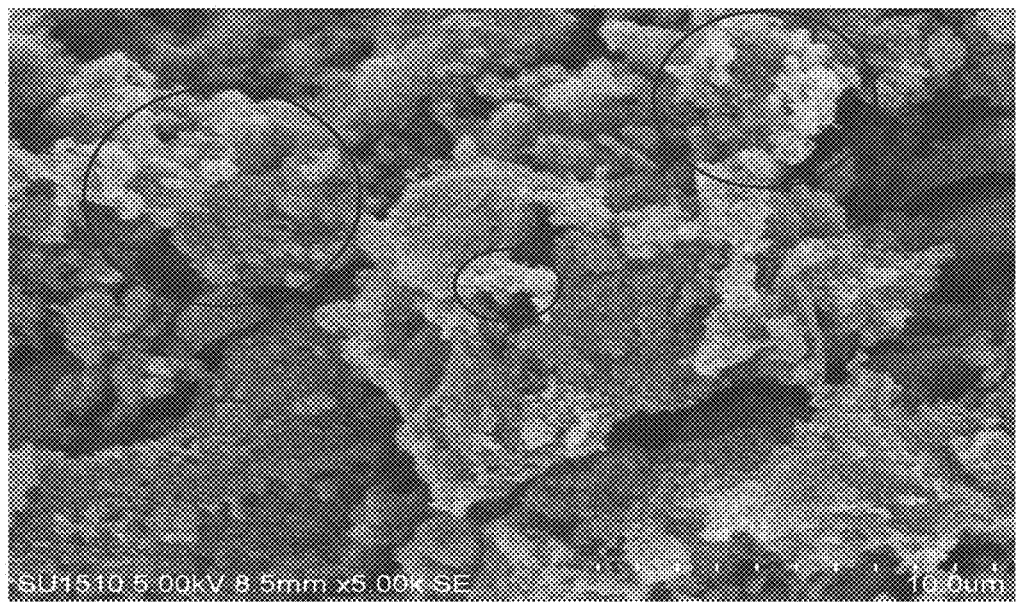
FIG. 1 is an SEM image of a repairing material of Example 1.
Figure 2:
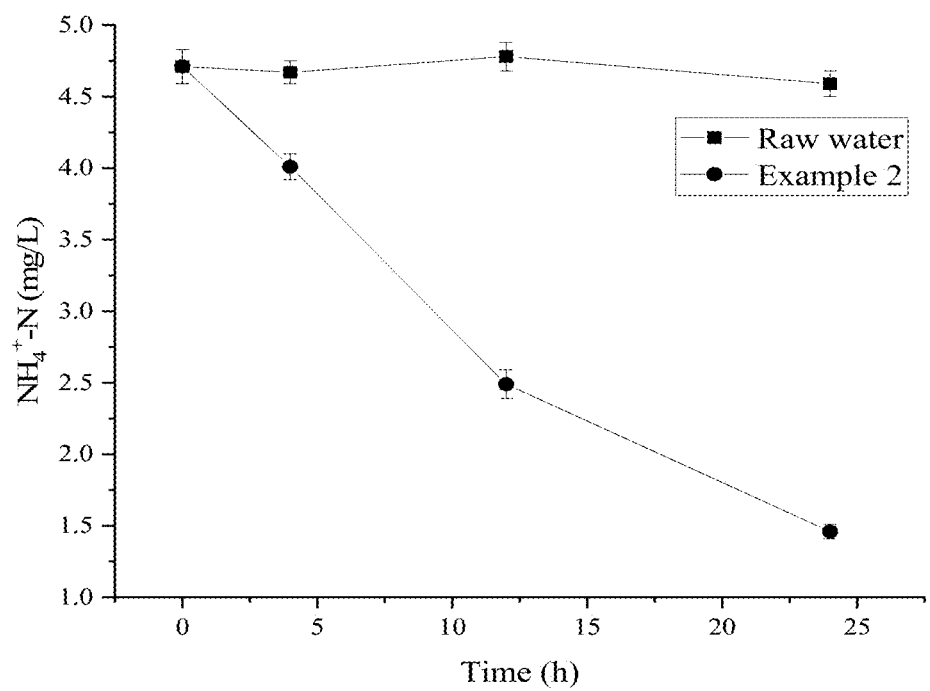
FIG. 2 is a time-dependent graph showing the change of $NH_4^+$—N in an urban polluted water body treated or not treated with the repairing material of Example 1 according to Example 2.
Figure 3:
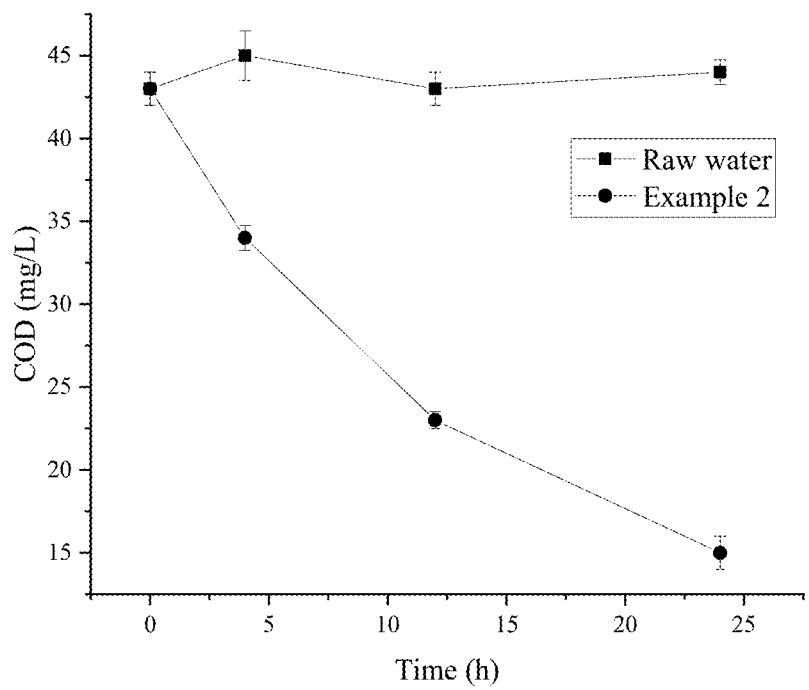
FIG. 3 is a time-dependent graph showing the change of COD in the urban polluted water body treated or not treated with the repairing material of Example 1 according to Example 2.
Figure 4:
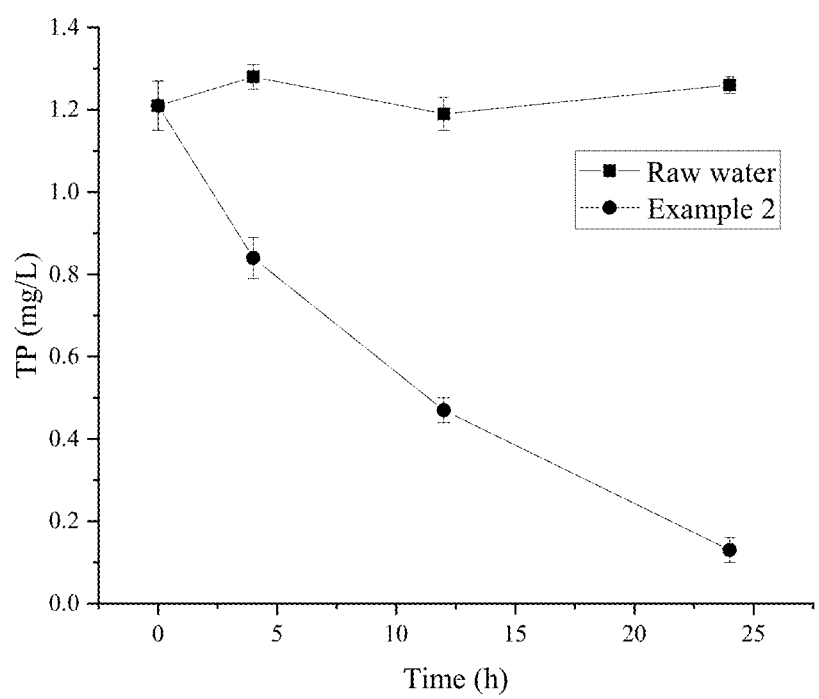
FIG. 4 is a time-dependent graph showing the change of total phosphorus (TP) in the urban polluted water body treated or not treated with the repairing material of Example 1 according to Example 2.
Figure 5:
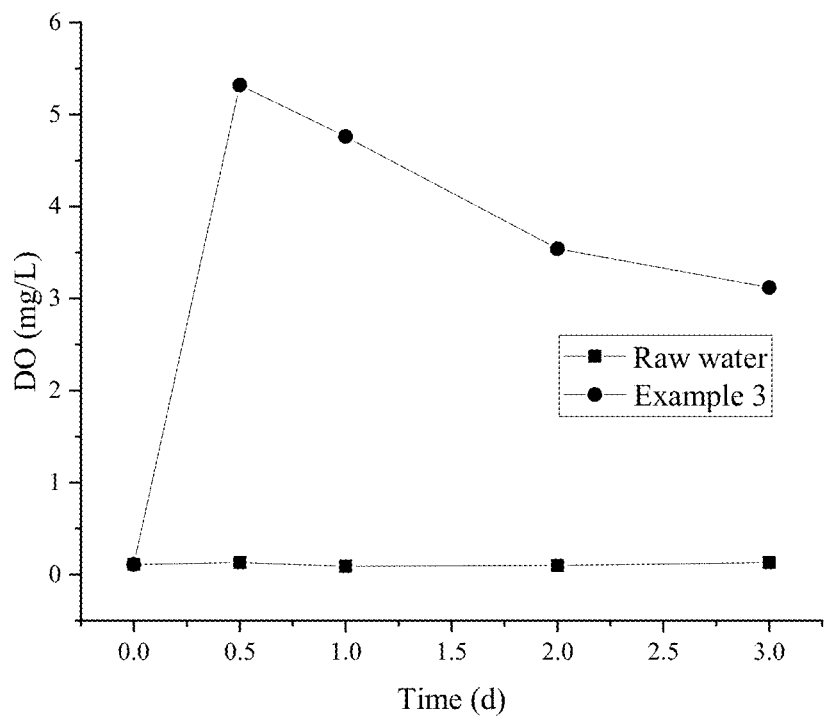
FIG. 5 is a time-dependent graph showing the change of dissolved oxygen (DO) in an urban polluted water body treated or not treated with the repairing material of Example 1 according to Example 3.
Figure 6:
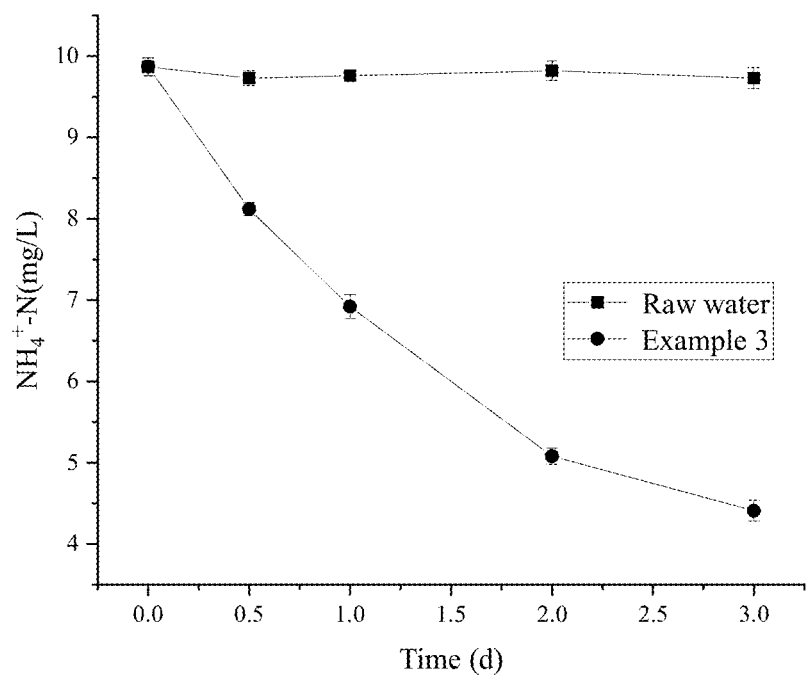
FIG. 6 is a time-dependent graph showing the change of $NH_4^+$—N in overlying water of a black and odorous river treated or not treated with the repairing material of Example 1 according to Example 3.
Figure 7:
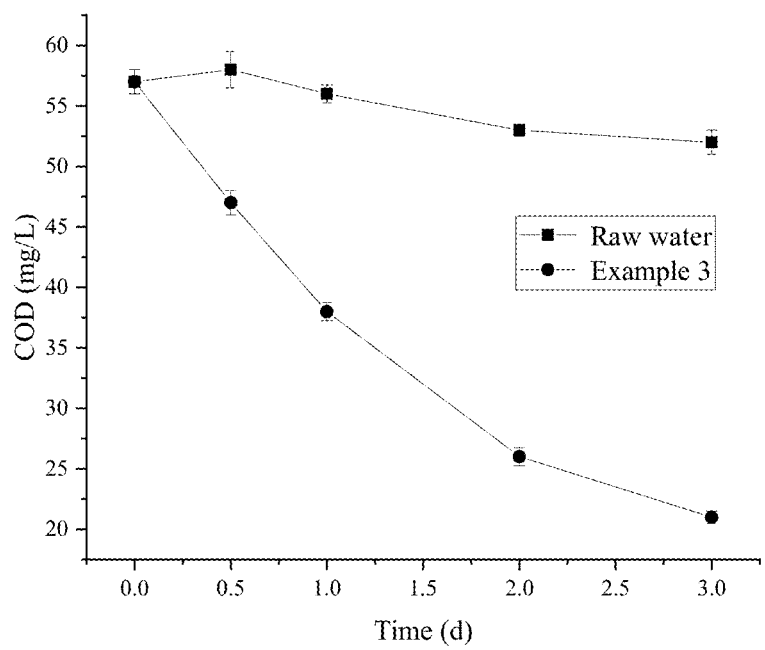
FIG. 7 is a time-dependent graph showing the change of COD in the overlying water of the black and odorous river treated or not treated with the repairing material of Example 1 according to Example 3.
Figure 8:
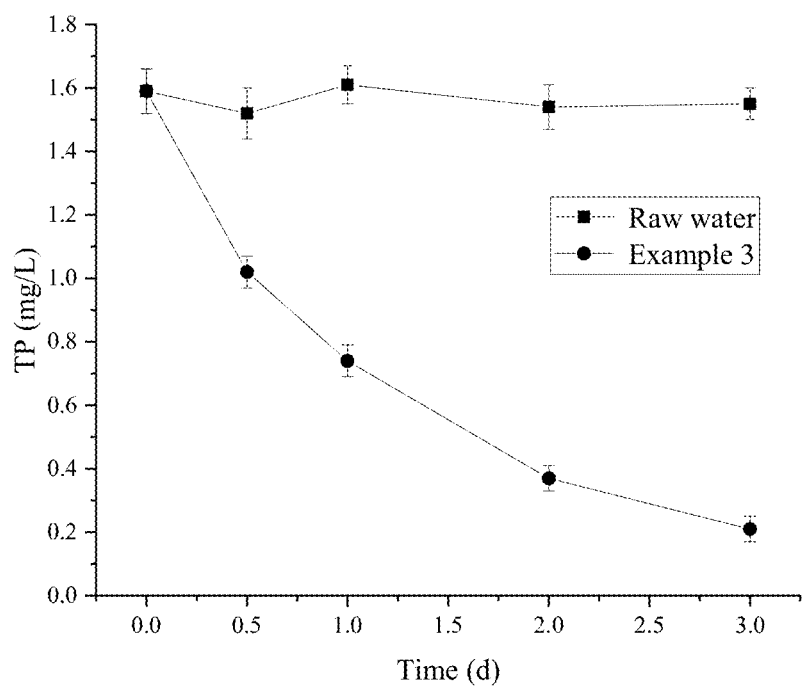
FIG. 8 is a time-dependent graph showing the change of total phosphorus (TP) in the overlying water of the black and odorous river treated or not treated with the repairing material of Example 1 according to Example 3.
Figure 9:
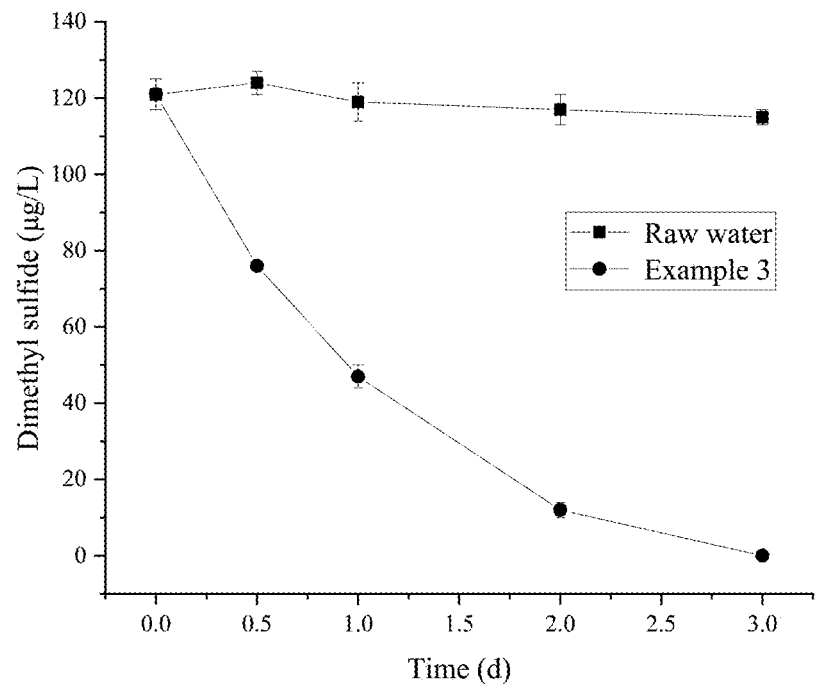
FIG. 9 is a time-dependent graph showing the change of dimethyl sulfide in the overlying water of the black and odorous river treated or not treated with the repairing material of Example 1 according to Example 3.

Preferred examples of the disclosure will be described below. It should be understood that the examples are intended to better explain the disclosure and are not intended to limit the disclosure.

Test Methods:

1. Determination of ammonia nitrogen content: Nessler's reagent spectrophotometry: (1) Drawing of standard curve: 0 mL, 0.50 mL, 1.00 mL, 3.00 mL, 5.00 mL, 7.00 mL and 10.00 mL of ammonium standard solution (0.1 mg/mL) are respectively pipetted into a 50 mL color comparison tube, water is added to the graduation line, 1.0 mL of potassium sodium tartrate solution (0.5 kg/L) is added, and the mixture is uniformly mixed. 1.5 mL of Nessler's reagent is added, and the mixture is uniformly mixed. After the mixture is allowed to stand for 10 min, absorbance is measured at a wavelength of 420 nm with a cuvette having a 10 mm optical path length with 0 concentration as a reference. Then the standard curve is drawn. (2) Test of water sample: A proper amount of water sample is added to a 50 mL color comparison tube and diluted to the graduation line, 1.0 mL of potassium sodium tartrate solution is added, and the mixture is uniformly mixed. 1.5 mL of Nessler's reagent is added, and the mixture is uniformly mixed. After 10 min of color development, absorbance is measured at 420 nm with an ultraviolet visible spectrophotometer (TU1810, PERSEE, Beijing, China). (3) Calculation: Ammonia nitrogen (mg/L)=1000×m/V, where m is the amount of ammonia nitrogen obtained from the absorbance (mg), and V is the volume of the water sample (mL).

2. Determination of COD: potassium dichromate method: 10 mL of acidic potassium dichromate solution (0.01 mol/L) is accurately pipetted into a 250 mL conical flask, 5 mL of a wastewater sample is pipetted into the conical flask, the conical flask is covered with a 50 mL beaker (to prevent floating materials from entry and avoid evaporation during heating) and put in a 160° C. oven. After the conical flask reaches 160° C. for 20 min, the conical flask is taken out and cooled, 30 mL of distilled water is added to the conical flask. After the mixture is cooled, three drops of ferroin indicator solution are added, and a ferrous ammonium sulfate standard solution (0.1 mol/L) is added dropwise until the mixture turns from bright green to reddish-brown. The blank is redistilled water or water with the same purity. The blank is also placed in the oven for 20 min and titrated with ferrous ammonium sulfate standard solution. The COD is calculated according to the formula: COD (mol/L)=$(V_0-V_1) \times C \times 8 \times 1000/V$, where $V_0$ is the volume of ferrous ammonium sulfate standard solution consumed in blank titration in mL, $V_1$ is the volume of ferrous ammonium sulfate standard solution consumed in titration of the water sample in mL, C is the molar concentration of the ferrous ammonium sulfate solution in mol/L, and 8 is the conversion value of the molar mass of (¼) $O_2$ in mol/L.

3. Determination of total phosphorus (TP) content (molybdate-antimony potassium tartrate-ascorbic acid spectrophotometry after potassium persulfate digestion): (1) Drawing of standard curve: 0 mL, 0.50 mL, 1.00 mL, 3.00 mL, 5.00 mL, 7.00 mL and 10.00 mL of phosphate standard solution (2 μg/ml) are respectively pipetted into a 50 mL color comparison tube, water is added to until the volume of the mixture is 25 mL, and 4 mL of potassium persulfate solution (50 g/L) is added. After 30 min of digestion at 121° C., the resulting mixture is cooled and made up to 50 mL. 1 mL of 10% ascorbic acid solution is added, and the mixture is uniformly mixed. After 30 s, 2 mL of molybdate solution is added, and the mixture is uniformly mixed. After 15 min of color development, absorbance is measured at 700 nm with an ultraviolet visible spectrophotometer (TU1810, PERSEE, Beijing, China). Then the standard curve is drawn. (2) Test of water sample: A proper amount of water sample is added to a 50 mL color comparison tube, water is added to make up to 25 mL, and 4.0 mL of potassium persulfate solution is added. After 30 min of digestion at 121° C., the resulting mixture is cooled and made up to 50 mL. 1 mL of 10% ascorbic acid solution is added, and the mixture is uniformly mixed. After 30 s, 2 mL of molybdate solution is added, and the mixture is uniformly mixed. After 15 min of color development, absorbance is measured at 700 nm with an ultraviolet visible spectrophotometer (TU1810, PERSEE, Beijing, China). (3) Calculation: Total phosphorus (mg/L)= m/V, where m is the amount of phosphorus obtained from the calibration curve (μg), and V is the volume of the water sample (mL).

4. Determination of iron content (atomic absorption spectrometry): Atomic absorption spectrometry is based on the strong absorption of atomic resonance radiation by ground state atoms of the analyte element in the gaseous state. The instrument used by the disclosure is an AA-7000 atomic absorption spectrophotometer from SHIMADZU Corporation. Working conditions of instrument: the wavelength is 248.7 nm, the spectral bandwidth is 0.4 nm, the lamp current is 6 mA, the acetylene flow rate is 1.5 L/min, the ratio of the combustible gas to the combustion-supporting gas is 1:4, the flame is an oxidizing flame, and no neon lamp is used for background correction. The water sample is directly tested after passing through a 0.45 μm filter membrane.

5. Determination of manganese content (atomic absorption spectrometry): Atomic absorption spectrometry is based on the strong absorption of atomic resonance radiation by ground state atoms of the analyte element in the gaseous state. The instrument used by the disclosure is an AA-7000 atomic absorption spectrophotometer from SHIMADZU Corporation. Working conditions of instrument: the wavelength is 279.5 nm, the spectral bandwidth is 0.4 nm, the lamp current is 6 mA, the acetylene flow rate is 1.5 L/min, the ratio of the combustible gas to the combustion-supporting gas is 1:4, the flame is an oxidizing flame, and no neon lamp is used for background correction. The water sample is directly tested after passing through a 0.45 μm filter membrane.

6. Determination of dimethyl sulfide (HS-SPME-GC-MS method): Before the enrichment, the solid-phase microextraction column (Supelco 75 μm CAR/PDMS) is previously activated at 250° C. for 30 min at the injection port of the gas chromatograph. According to the SPME process, 5 g of sodium chloride is added to a 40 mL sample bottle, and then 20 mL of water sample is added. The enrichment is carried out at a temperature of 50° C. at a speed of 500 rpm for 30 min. After the enrichment of the pollutant is completed, the pollutant on the solid-phase microextraction column is desorbed at 250° C. for 5 min in the injection port of the gas chromatograph in the splitless mode, and analysis is carried out. The gas chromatograph equipped with TG-WAXMS capillary columns (Zebron, 30 m×0.25 mm ID, 0.25 μm DF) and combined with a quadrupole mass spectrometer (Trace GC-MS, Thermo Fisher Scientific) is used for the detection of the compound. The temperature program is as follows: The temperature is 40° C. initially and held for 2 min, then increased at 8° C.·min$^{-1}$ to 220° C. and held for 3 min, and finally, increased at 8° C.·min$^{-1}$ to 250° C. and held for 3 min, and then the analysis is completed. The carrier gas is helium, at a constant flow rate of 0.5 mL·min$^{-1}$. The temperature of the ion source and the transfer lines is 250° C. The instrument is operated in a full scan mode within a mass range of 40-300 amu at an IE energy of 70 eV.

Example 1

A preparation method of a repairing material for emergency treatment of a black and odorous surface water environment specifically included the following steps:

(1) Granular activated carbon purchased from Sinopharm Chemical Reagent Co., Ltd. was soaked in 1 mol·L$^{-1}$ hydrochloric acid solution for 2 h, repeatedly washed with deionized water until the residual water was neutral, soaked in 1 mol·L$^{-1}$ sodium hydroxide solution for 2 h, repeatedly washed with deionized water until the residual water was neutral such that impurities were removed. The granular activated carbon was dried in an oven at 105° C. and then ground. The powdered activated carbon was passed through a 200-mesh sieve to obtain pretreated activated carbon.

(2) 30 mL of deionized water was put into a 500 mL beaker, and 2 g of the pretreated powdered activated carbon in step (1), 13 g of calcium chloride, 15 mL of 1 mol·L$^{-1}$ ammonia water solution and 120 mL of PEG 200 (polyethylene glycol) were sequentially added. After uniform stirring, the mixture was stirred in a magnetic stirrer at a constant speed (180 rpm) for 30 min. 15 mL of 30% hydrogen peroxide solution was added to the system at a rate of 3 drops per minute to obtain a calcium peroxide repairing material solution: At first, a reaction $CaCl_2+H_2O_2 \rightarrow CaO_2+2HCl$ occurred in the solution, then a certain amount of ammonia water solution contained in the solution neutralized the hydrogen chloride to generate ammonium chloride ($2HCl+2NH_3 \rightarrow 2NH_4Cl$) which promoted generation of calcium peroxide, with the continuous addition of the hydrogen peroxide, the solution slowly turned from black to grey, and at this time, the calcium peroxide repairing material solution was obtained. The whole preparation process was completed at room temperature.

(3) After the completion of the reaction, a sodium hydroxide solution having a pH of 13 was added to the calcium peroxide repairing material solution in step (2) (to form an alkaline medium) until the pH reached 11.5 and the mixture became a grey suspension. The suspension was centrifuged to obtain a grey precipitate, and at the same time, the solid obtained after the centrifuging was washed with a NaOH solution 3 times. Finally, the grey precipitate was washed with distilled water twice until a final pH of the residual water reached 8.4. The obtained precipitate was dried in a vacuum oven at 80° C. to obtain the repairing material. The morphology of the repairing material is shown in FIG. 1.

FIG. 1 is an SEM image of the repairing material obtained in Example 1. As can be seen, the calcium peroxide was successfully supported on the surface of the activated carbon.

Example 2

The repairing material of Example 1 was used for treatment of an urban polluted water body (in an amount of 150 mg/L), specifically including the following steps:

150 mg of the repairing material of Example 1 was added to 5 mL of deionized water to obtain a slurry. The slurry was added to 1 L of urban polluted water, and the mixture was stirred uniformly and tested for ammonia nitrogen, TP and COD concentrations at 4 h, 12 h and 24 h.

FIG. 2 to FIG. 5 and Table 1 show the changes of various indicators in the urban polluted water body treated or not treated with the repairing material of Example 1. As can be seen from FIG. 2 to FIG. 5 and Table 1, the main pollution indicator (ammonia nitrogen, COD and total phosphorus) concentration in the river all showed a downward trend, and the removal rates of ammonia nitrogen, COD and total phosphorus after 24 h respectively reached 59%, 65% and 89%, which showed a good emergency treatment effect for river pollution indicators.

TABLE 1

Experimental results on water quality before and after treatment with repairing material

| Example | Ammonia nitrogen (mg/L) | COD (mg/L) | Total phosphorus (mg/L) |
| --- | --- | --- | --- |
| Raw water | 4.71 | 43 | 1.21 |
| Example 2 | 1.46 | 16 | 0.13 |
| Removal rate | 69% | 63% | 89% |

Example 3

The repairing material of Example 1 was used for treatment of overlying water of a black and odorous river (in an amount of 150 mg/L), specifically including the following steps:

Overlying water of a black and odorous river was collected with a 50 L bucket. 7.5 g of the repairing material of Example 1 was added to 250 mL of deionized water to obtain a slurry. The slurry was added to 50 L of the black and odorous water, and the mixture was stirred uniformly (an amount of the repairing material added was 150 mg/L).

Figure 10:
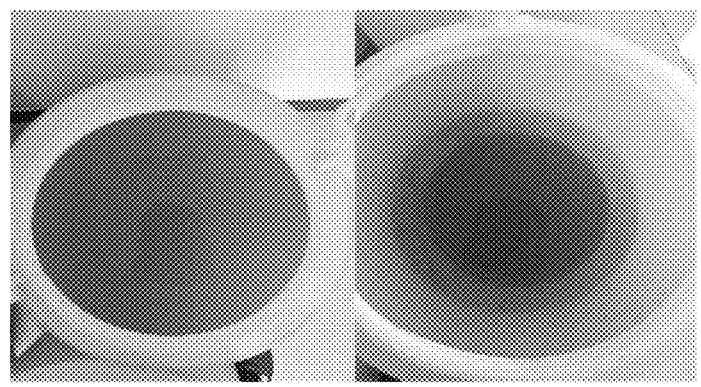
FIG. 10 shows actual photographs of the overlying water of the black and odorous river (black and odorous water body) before and after being treated or not treated with the repairing material of Example 1 according to Example 3.

After 3 days of experimentation, FIGS. 6, 7, 8 and 9 and Table 2 showed that the concentrations of ammonia nitrogen, COD, total phosphorus and dimethyl sulfide all showed a downward trend. This was because the iron and manganese ions at respective concentrations of 0.313 mg/L and 0.421 mg/L in the black and odorous water body could catalyze the generation of hydrogen peroxide from calcium peroxide and thus the generation of hydroxyl radicals, which could oxidize organic pollutants and part of odorous substances. Besides, the activated carbon in the repairing material could adsorb the organic pollutants and odorous substances. The $Ca(OH)_2$ generated by the reaction had the effect of flocculation, and the calcium ions dissolved in water could bind to the phosphate ions in the water to generate hydroxyapatite. Finally, the removal rates of the ammonia nitrogen, the COD, the total phosphorus and the dimethyl sulfide were respectively 58%, 63%, 87% and 100%. The concentration of dissolved oxygen in the black and odorous water body was kept at 3 $mg \cdot L^{-1}$ or above (FIG. 5). 3 days after the repairing material was added, the overlaying water of the black and odorous water body became clear and transparent (FIG. 10).

The result indicated that the repairing material of Example 1 had a good effect on emergency treatment of the urban black and odorous river. First, the repairing material could quickly increase the dissolved oxygen in the water body and eliminate the odor (dimethyl sulfide) in the water body. Second, the repairing material could gradually improve the habitat and transparency of the water body, and reduce toxic substances such as ammonia nitrogen. Finally, the repairing material could greatly reduce the pollution indices (COD, total phosphorus, etc.) of the water body.

TABLE 2

Experimental results on physical and chemical indices of water quality before and after treatment with repairing material

| Example | pH | Dissolved oxygen (DO) (mg/L) | Ammonia nitrogen (mg/L) | COD (mg/L) | Total phosphorus (mg/L) | Iron (mg/L) | Manganese (mg/L) | Dimethyl sulfide (μg/L) |
| --- | --- | --- | --- | --- | --- | --- | --- | --- |
| Raw water | 7.21 | 0.11 | 9.87 | 57 | 1.59 | 0.313 | 0.421 | 121 |
| Example 3 | 8.12 | 3.12 | 4.11 | 21 | 0.21 | 0.012 | 0.023 | — |

Example 4

The repairing material of Example 1 was used to repair the river sediment (the repairing material was uniformly spread on the surface of a heavily polluted river in an amount of 0.24 kg·m$^{-2}$ and allowed to settle to the bottom of the river to cover the sediment), specifically including the following steps:

A dead end river in Wuxi City (N31° 33'20.08", E120° 16'36.52"), having a length of about 0.32 km, an average width of about 12 m, a water depth of about 2-2.5 m and a sediment thickness of about 0.75 m, was selected. The repairing material, which had been wetted with water, was uniformly spread on the surface of the heavily polluted river in the amount of 0.24 kg·m$^{-2}$ and allowed to settle to the bottom of the river to cover the sediment. A total of 6 sampling points were set in the river (every 50 m), and the 6 sampling points were regarded as parallel control monitoring points.

The overlying water and the surface sediment (0-10 cm deep) at the 6 sampling points were respectively collected using a water sampler and a grab gravity sampler. The sediment was centrifuged by a refrigerated centrifuge to obtain interstitial water. The overlaying water and the sediment one month before the experimentation (August 2019 to September 2019) were used as the reference. After about 7 d, the water sample and the sediment were collected and tested for their indices. After the repairing material was added, the water sample and the sediment were collected and tested for their indices. The experimental period was 2 months (September 2019 to November 2019).

Figure 11:
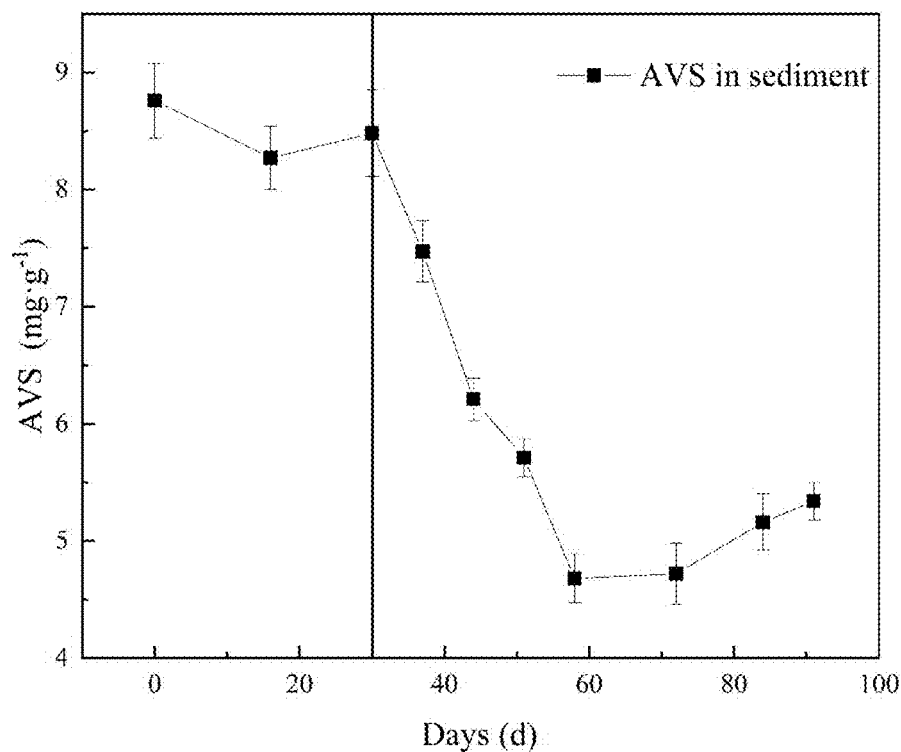
FIG. 11 shows the change of AVS in the sediment in the whole experimental period according to Example 4.
Figure 12:
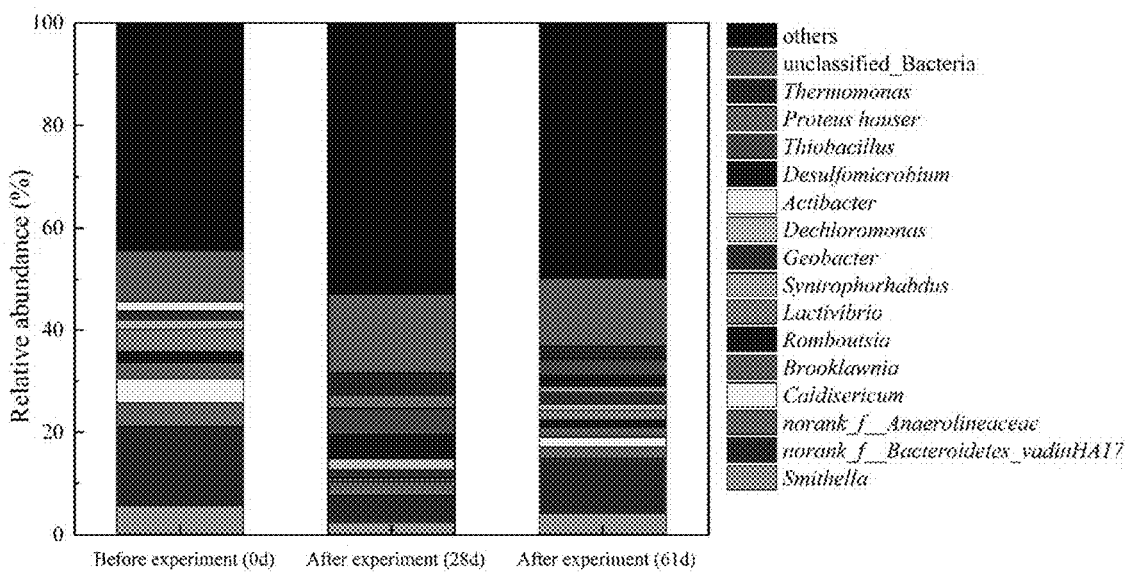
FIG. 12 shows relative abundance of microorganisms at the genus level in the sediment on 0 d, 28 d and 61 d after coverage with the repairing material according to Example 4.
Figure 13:
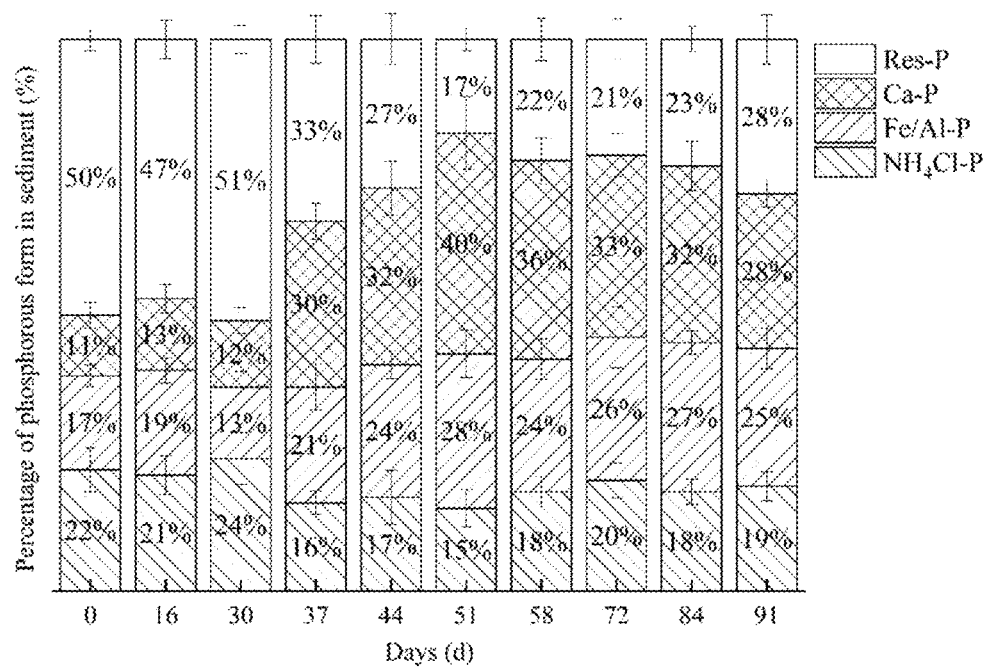
FIG. 13 shows the number of sequences and the diversity indices of microorganisms in the sediment on 0 d, 28 d and 61 d after the coverage with the repairing material according to Example 4.

The test results are shown in FIG. 11 to FIG. 13, Table 3 and Table 4.

FIG. 11 shows the change of AVS in the sediment in the whole experimental period. As can be seen from FIG. 11, the average AVS in the sediment before the experiment was 8.52 mg·g$^{-1}$; and after the sediment was covered by the repairing material, the AVS in the sediment showed a downward trend, the removal rate of AVS reached its peak 44.81% on 28 d, and the removal rate of AVS was 37.08% at the end of the experiment.

FIG. 12 shows relative abundance of microorganisms at the genus level in the sediment on 0 d, 28 d and 61 d after coverage with the repairing material. As can be seen from FIG. 12, before the coverage with the repairing material, the dominant bacteria genera in the sediment were norank_f_Bacteroidetes_vadinHA17 (15.26%), norank_f_Anaerolineaceae (4.76%), *Caldisericum* (4.65%), *Lactivibrio* (4.37%), *Romboutsia* (2.08%) and *Syntrophorhabdus* (1.83%). The norank_f_Anaerolineaceae, belonging to the genus *Anaerolinea*, could decompose nitrogen-containing organic matters under anaerobic conditions, thereby increasing the $NH_4^+$—N concentration in the water body. The *Caldisericum* could reduce sulfate into $H_2S$ under anaerobic conditions, and the $H_2S$ released from the sediment could make suspendable substances on the surface of the sediment reenter the overlying water, thereby affecting the transparency of the water body. The *Romboutsia* and the *Syntrophorhabdus*, which were main bacteria genera[101] in anaerobic acidogenesis, could cause sediment acidification. After the coverage with the repairing material, the relative abundances of the anaerobes decreased significantly. The relative abundances of the anaerobes respectively dropped to 1.35%, 0.3%, 0.1% and 0.23% on 28 d, and became 2.22%, 1.96%, 1.43% and 1.1% on 61 d. This indicated that the coverage with the repairing material could significantly reduce the relative abundances of the anaerobes in the sediment, thereby reducing the risk of the release of $NH_4^+$—N and $H_2S$ and avoiding the sediment acidification.

Table 3 shows the number of sequences and the diversity indices of the microorganisms in the sediment on 0 d, 28 d and 61 d after the coverage with the repairing material. As can be seen from Table 3, the effective number of sequences ranged from 41019 to 44809, and the percentage of coverage of the sample was greater than 99%, which indicated that the results of microbial sequencing could express the diversity of microorganisms in the sediment. Chao and ACE indices can reflect the richness of microbial communities. The Chao and ACE indices in the samples were respectively 802-868 and 792-861, which proved that the microbial communities in the sediment had similar abundances. The Shannon index and the Simpson index can directly reflect the species diversity. The higher the Shannon index and the lower the Simpson index, the better the community diversity. As can be seen from Table 3, compared with those before the experiment, after the coverage of the repairing material, the Shannon index increased, and the Simpson index decreased, which indicated that the coverage with the repairing material could increase the diversity of the microbial communities.

TABLE 3

Diversity indices of microbial samples in sediment

| Days/d | Effective number of sequences | Chao index | ACE index | Shannon index | Simpson index | Percentage of coverage/% |
|---|---|---|---|---|---|---|
| 0 | 41019 | 868 | 850 | 4.65 | 0.03 | 99.91 |
| 28 | 44809 | 852 | 861 | 5.08 | 0.01 | 99.91 |
| 61 | 43862 | 802 | 792 | 4.81 | 0.02 | 99.92 |

As can be seen from Table 4, after the coverage of the repairing material, the content of Tot-P in the sediment increased in the early stage (Table 4), which further proved that DIP in the interstitial water was immobilized in the sediment, thereby reducing the risk of the release of phosphorus in the sediment.

TABLE 4

Change of Tot-P in sediment

|  | Days/d | Tot-P/mg · g$^{-1}$ |
|---|---|---|
| Before experiment | 0 | 8.14 ± 0.13 |
|  | 16 | 7.90 ± 0.17 |
|  | 30 | 8.01 ± 0.13 |
| After experiment | 37 | 8.32 ± 0.16 |
|  | 44 | 8.29 ± 0.19 |
|  | 61 | 8.45 ± 0.20 |
|  | 68 | 8.22 ± 0.16 |
|  | 72 | 8.31 ± 0.18 |
|  | 84 | 8.22 ± 0.13 |
|  | 91 | 8.20 ± 0.14 |

FIG. 13 shows the changes in the proportions of different phosphorus forms in the sediment in the experimental period. As can be seen from FIG. 13, before the experiment, the proportions of $NH_4Cl$—P (21%-24%), Fe/Al—P (13%-19%), Ca—P (11%-13%) and Res-P (47%-51%) in the sediment were very close, and Res-P accounted for the principal part. After the repairing material was added, the proportions of $NH_4Cl$—P and Res-P respectively showed a downward trend, and the proportions of Fe/Al—P and Ca—P significantly increased. On 21 d, the proportions of Fe/Al—P and Ca—P reached their peaks, 28% and 40% respectively. This was because a large amount of organophosphorus in Res-P was mineralized into Fe/Al—P and Ca—P.

As can be seen from FIG. 11 to FIG. 13, Table 3 and Table 4, the repairing material had good stability in the repair of the sediment, and was not affected by the entry of exogenous pollutants.

Comparative Example 1

The "hydrogen peroxide solution was added dropwise" in the preparation method of the repairing material in Example 1 was replaced with "15 mL of 30% hydrogen peroxide solution was added at one time", and the other parameters remained unchanged. A repairing material was obtained.

Comparative Example 2

The time of adding the pretreated activated carbon was adjusted to: after the calcium peroxide solution was formed. The preparation method specifically included:

Granular activated carbon purchased from Sinopharm Chemical Reagent Co., Ltd. was soaked in 1 mol·$L^{-1}$ hydrochloric acid solution for 2 h, repeatedly washed with deionized water until the residual water was neutral, soaked in 1 mol·$L^{-1}$ sodium hydroxide solution for 2 h, repeatedly washed with deionized water until the residual water was neutral such that impurities were removed. The granular activated carbon was dried in an oven at 105° C. and then ground. The powdered activated carbon was passed through a 200-mesh sieve. 30 mL of deionized water was put into a 500 mL beaker, and 13 g of calcium chloride, 15 mL of 1 mol·$L^{-1}$ ammonia water solution and 120 mL of PEG 200 (polyethylene glycol) were sequentially added. After uniform stirring, the mixture was stirred in a magnetic stirrer at a constant speed (180 rpm). 15 mL of 30% hydrogen peroxide solution was added to the system at a rate of 3 drops per minute to obtain a calcium peroxide solution: At first, a reaction $CaCl_2+H_2O_2 \rightarrow CaO_2+2HCl$ occurred in the solution, then a certain amount of ammonia water contained in the solution neutralized the hydrogen chloride to generate ammonium chloride ($2HCl+2NH_3 \rightarrow 2NH_4Cl$) which promoted generation of calcium peroxide, with the continuous addition of the hydrogen peroxide, the solution slowly turned from colorless to pale yellow, and at this time, the calcium peroxide solution was obtained. Then, 2 g of the pretreated powdered activated carbon was added, and the mixture was stirred in a magnetic stirrer at a constant speed (180 rpm) for 30 min. The whole preparation process was completed at room temperature. After the completion of the reaction, a sodium hydroxide solution having a pH of 13 was added (to form an alkaline medium) until the pH reached 11.5 and the mixture became a grey suspension. The suspension was centrifuged to obtain a grey precipitate, and at the same time, the solid obtained after the centrifuging was washed with a NaOH solution 3 times. Finally, the grey precipitate was washed with distilled water twice until a final pH of the residual water reached 8.4. The obtained precipitate was dried in a vacuum oven at 80° C. to obtain the repairing material.

The repairing materials of Comparative Examples 1 and 2 were tested for their performance according to Examples 2 and 3. The test results are shown in Table 5 and Table 6 below:

Table 5 shows the test results on the treatment of the urban polluted water body: with reference to Table 1, in terms of the removal effects of ammonia nitrogen, COD and TP, Example 2>Comparative Example 2>Comparative Example 1. This indicated that the preparation method of Example 1 is better than that in Comparative Example 2 and in Comparative Example 1, and the preparation method of Example 1 was the best.

TABLE 5

Experimental results on water quality before and after treatment with repairing material

| | Ammonia nitrogen (mg/L) | COD (mg/L) | Total phosphorus (mg/L) |
|---|---|---|---|
| Raw water | 4.71 | 43 | 1.21 |
| Comparative Example 1 | 3.46 | 34 | 0.58 |
| Removal rate of Comparative Example 1 | 26% | 21% | 52% |
| Comparative Example 2 | 2.15 | 23 | 0.2 |
| Removal rate of Comparative Example 2 | 54% | 47% | 83% |

Table 6 shows the test results on the treatment of the overlying water of the black and odorous river. As can be seen from Table 6, at the end of the experiment, the DO concentration in Example 1 was 3.12 mg/L, which was much higher than that in Comparative Examples 1 and 2; the removal rates of ammonia nitrogen, COD, TP, iron and manganese were all much higher than those in Comparative Examples 1 and 2; the pH in Example 1 was only slightly higher than that in Comparative Examples 1 and 2; and the content of the odorous substance dimethyl sulfide in Example 1 and Comparative Example 2 was respectively lower than the limit of detection, and the concentration of the dimethyl sulfide in Comparative Example 1 at the end of the experiment was 44 μg/L. These further indicated that the preparation method of Example 1 was better than that in Comparative Example 2 and Comparative Example 1, and the preparation method of Example 1 was the best.

TABLE 6

Experimental results on physical and chemical indices of water quality before and after treatment with repairing material

| Example | pH | Dissolved oxygen (mg/L) | Ammonia nitrogen (mg/L) | COD (mg/L) | Total phosphorus (mg/L) | Iron (mg/L) | Manganese (mg/L) | Dimethyl sulfide (μg/L) |
|---|---|---|---|---|---|---|---|---|
| Raw water | 7.21 | 0.11 | 9.87 | 57 | 1.59 | 0.313 | 0.421 | 121 |
| Example 1 | 8.12 | 3.12 | 4.11 | 21 | 0.21 | 0.012 | 0.023 | — |
| Comparative Example 1 | 7.95 | 0.78 | 7.31 | 40 | 0.75 | 0.121 | 0.134 | 44 |

TABLE 6-continued

Experimental results on physical and chemical indices of water quality before and after treatment with repairing material

| Example | pH | Dissolved oxygen (mg/L) | Ammonia nitrogen (mg/L) | COD (mg/L) | Total phosphorus (mg/L) | Iron (mg/L) | Manganese (mg/L) | Dimethyl sulfide (μg/L) |
|---|---|---|---|---|---|---|---|---|
| Comparative Example 2 | 8.03 | 1.96 | 5.64 | 29 | 0.38 | 0.043 | 0.067 | — |

Comparative Example 3

The pretreated activated carbon in Example 1 was replaced with pretreated natural clinoptilolite. The preparation method of the pretreated natural clinoptilolite included:

Natural clinoptilolite with a particle size of 0.5-1.0 mm was soaked with a 1 mol/L soluble calcium salt solution by flipping at room temperature (160 rpm, 12 h) to obtain the pretreated natural clinoptilolite.

The rest was the same as in Example 1, and a repairing material was obtained.

The obtained repairing material was tested for its performance. The test method was the same as in Example 2. The test results are as follows:

TABLE 7

Experimental results on water quality before and after treatment with repairing materials prepared with activated carbon and clinoptilolite

| Example | Ammonia nitrogen (mg/L) | COD (mg/L) | Total phosphorus (mg/L) |
|---|---|---|---|
| Raw water | 4.71 | 43 | 1.21 |
| Example 1 (activated carbon) | 1.46 | 16 | 0.13 |
| Removal rate | 69% | 63% | 89% |
| Comparative Example 3 (natural clinoptilolite) | 1.41 | 16.8 | 0.14 |
| Removal rate | 70% | 61% | 88% |

Comparative Example 4

The ammonia water solution in step (2) in Example 1 was replaced with sodium hydroxide, the rest was the same as in Example 1, and a repairing material was obtained.

The obtained repairing material was tested for its performance. The test method was the same as in Example 2. The test results are as follows:

TABLE 8

Experimental results on water quality before and after treatment with repairing materials prepared with ammonia water solution and sodium hydroxide

| Example | Ammonia nitrogen (mg/L) | COD (mg/L) | Total phosphorus (mg/L) | pH |
|---|---|---|---|---|
| Raw water | 4.71 | 43 | 1.21 | 7.21 |
| Example 1 (ammonia water solution) | 1.46 | 16 | 0.13 | 8.12 |
| Removal rate | 69% | 63% | 89% | |
| Comparative Example 4 (sodium hydroxide solution) | 1.55 | 21 | 0.16 | 8.75 |
| Removal rate | 67% | 51% | 86% | |

Comparative Example 5

The mass ratio of the pretreated activated carbon to the calcium chloride to the water in step (2) in Example 1 (2:13:30) was adjusted to 2:20:30, the rest was the same as in Example 1, and a repairing material was obtained.

The obtained repairing material was tested for its performance. The test method was the same as in Example 2. The test results are as follows:

TABLE 9

Experimental results on water quality before and after treatment with repairing materials prepared from components in different ratios

| Example | Ammonia nitrogen (mg/L) | COD (mg/L) | Total phosphorus (mg/L) |
|---|---|---|---|
| Raw water | 4.71 | 43 | 1.21 |
| Example 1 (2:13:30) | 1.46 | 16 | 0.13 |
| Removal rate | 69% | 63% | 89% |
| Comparative Example 5 (2:20:30) | 1.35 | 18.2 | 0.23 |
| Removal rate | 71% | 58% | 81% |

Comparative Example 6

The mass ratio of the pretreated activated carbon to the calcium chloride to the water in step (2) in Example 1 (2:13:30) was adjusted to 5:13:30, the rest was the same as in Example 1, and a repairing material was obtained.

The obtained repairing material was tested for its performance. The test method was the same as in Example 2. The test results are as follows:

TABLE 10

Experimental results on water quality before and after treatment with repairing materials prepared from components in different ratios

| Example | Ammonia nitrogen (mg/L) | COD (mg/L) | Total phosphorus (mg/L) |
|---|---|---|---|
| Raw water | 4.71 | 43 | 1.21 |
| Example 1 (2:13:30) | 1.46 | 16 | 0.13 |
| Removal rate | 69% | 63% | 89% |
| Comparative Example 6 (5:13:30) | 1.45 | 16.5 | 0.12 |
| Removal rate | 69% | 61% | 90% |

Comparative Example 7

The adjustment of pH in step (3) in Example 1 was omitted. The calcium peroxide repairing material solution obtained in step (2), having a pH of 10.2, could not form a suspension at all. After that, the pH was not adjusted, and the final pH was 9.9. A repairing material was obtained.

The obtained repairing material was tested for its performance. The test method was the same as in Example 3. The test results are as follows:

TABLE 11

Experimental results on physical and chemical indices of water quality before and after treatment with repairing material obtained with or without adjustment of pH

| Example | pH | Dissolved oxygen (DO) (mg/L) | Ammonia nitrogen (mg/L) | COD (mg/L) | Total phosphorus (mg/L) | Iron (mg/L) | Manganese (mg/L) | Dimethyl sulfide (µg/L) |
|---|---|---|---|---|---|---|---|---|
| Raw water | 7.21 | 0.11 | 9.87 | 57 | 1.59 | 0.313 | 0.421 | 121 |
| Example 1 (with adjustment of pH) | 8.12 | 3.12 | 4.11 | 21 | 0.21 | 0.012 | 0.023 | — |
| Comparative Example 7 (without adjustment of pH) | 9.37 | 3.05 | 4.15 | 24 | 0.31 | 0.056 | 0.054 | — |
| Percentage difference | | 17% | 63.6% | 0.4% | 5.2% | 6.2% | 14.5% | 7.3% |

Although the disclosure has been provided as above by way of the preferred examples, they are not intended to limit the disclosure. Any person skilled in the art can make various changes and modifications without departing from the spirit and scope of the disclosure. Therefore, the protection scope of the disclosure should be as defined in the claims.

What is claimed is:

1. A preparation method, comprising the following steps:
(1) uniformly stirring activated carbon, calcium chloride, ammonia water solution, polyethylene glycol and water in a stirrer, then dropwise adding hydrogen peroxide solution with stirring, and after the completion of the dropwise adding, obtaining a calcium peroxide solution;
(2) adding a sodium hydroxide solution to the calcium peroxide solution obtained in step (1) until a pH reaches 11.5, thereby obtaining a suspension;
(3) centrifuging the suspension in step (2) to obtain a precipitate; and
(4) washing the precipitate in step (3) with distilled water until a final pH of residual water reaches 8.4, and then drying the obtained precipitate to obtain a dried precipitate;
wherein in step (1), the activated carbon is pretreated by the following steps: soaking activated carbon in 0.5-1.5 mol·L$^{-1}$ hydrochloric acid solution for 1.5-2.5 hours, repeatedly washing the activated carbon with deionized water until the residual water is neutral, soaking the activated carbon in 0.5-1.5 mol·L$^{-1}$ sodium hydroxide solution for 1.5-2.5 hour, repeatedly washing the activated carbon with deionized water until the residual water is neutral such that impurities are removed, drying the activated carbon in an oven at 105° C., grinding the activated carbon to obtain powered activated carbon, and passing the powdered activated carbon through a 200-mesh sieve.

2. The preparation method according to claim 1, wherein in step (1), a mass ratio of the activated carbon to the calcium chloride to the water is 1-3:13:30.

3. The preparation method according to claim 1, wherein in step (1), a mass/volume ratio of the activated carbon to the ammonia water solution to the polyethylene glycol, in g/mL, is 1-3:15:120.

4. The preparation method according to claim 1, wherein in step (1), the hydrogen peroxide solution has a concentration of 30%, and is dropwise added at a rate of 3 drops per minute.

5. The preparation method according to claim 1, wherein in step (1), a mass/volume ratio of the activated carbon to the hydrogen peroxide solution, in g/mL, is 1-3:15.

6. The preparation method according to claim 1, wherein in step (1), the uniform stirring is carried out at a speed of 180 rpm for 30 minutes.

7. The preparation method according to claim 1, wherein in step (1), a mass ratio of the activated carbon to the calcium chloride to the water is 2:13:30; and a mass/volume ratio of the activated carbon to the ammonia water solution to the polyethylene glycol is 2:15:120.

8. The preparation method according to claim 1, wherein in step (4), the drying is drying in a vacuum oven at 80° C. for 2-4 hours.

9. The preparation method according to claim 1, wherein in step (1), the ammonia water solution has a concentration of 1 mol·L$^{-1}$.

10. The preparation method according to claim 1, wherein in step (2), the sodium hydroxide solution has a pH of 13.

11. The preparation method according to claim 1, wherein the activated carbon is granular activated carbon, and the preparation method further comprises the following steps:
soaking granular activated carbon in 1 mol·L$^{-1}$ hydrochloric acid solution for 2 hours, repeatedly washing the granular activated carbon with deionized water until the residual water is neutral, soaking the granular activated carbon in 1 mol·L$^{-1}$ sodium hydroxide solution for 2 hours, repeatedly washing the granular activated carbon with deionized water until the residual water is neutral such that impurities are removed, drying the granular activated carbon in an oven at 105° C., grinding the granular activated carbon to obtain powdered activated carbon, and passing the powdered activated carbon through a 200-mesh sieve;
(2) putting 30 ml of deionized water into a 500 ml beaker, sequentially adding 2 g of the pretreated powdered activated carbon in step (1), 13 g of calcium chloride, 15 ml of 1 mol·L$^{-1}$ ammonia water solution and 120 mL of PEG 200, and after uniform stirring, stirring the mixture in a magnetic stirrer at a constant speed of 180 rpm for 30 minutes; adding 15 ml of hydrogen peroxide solution with a mass concentration of 30% to the system at a rate of 3 drops per minute to obtain the calcium peroxide solution: at first, a reaction $CaCl_2 + H_2O_2 \rightarrow CaO_2 + 2HCl$ occurs in the solution, then a certain amount of ammonia water contained in the solution neutralizes the hydrochloric acid to generate ammonium chloride ($2HCl + 2NH_3 \rightarrow 2NH_4Cl$) which promotes generation of calcium peroxide, with the continuous addition of the hydrogen peroxide, the solution slowly turns from black to grey, and at this time, the calcium peroxide solution is obtained, wherein the whole preparation process is completed at room temperature.

* * * * *